US012788179B2

(12) United States Patent
Leykin

(10) Patent No.: US 12,788,179 B2
(45) Date of Patent: Nov. 10, 2026

(54) DISPENSING DEVICE FOR HOT FOOD VENDING MACHINES

(71) Applicant: Leon Leykin, Pikesville, MD (US)

(72) Inventor: Leon Leykin, Pikesville, MD (US)

( * ) Notice: Subject to any disclaimer, the term of this patent is extended or adjusted under 35 U.S.C. 154(b) by 227 days.

(21) Appl. No.: 18/951,887

(22) Filed: Nov. 19, 2024

(65) Prior Publication Data

US 2025/0169645 A1 May 29, 2025

Related U.S. Application Data

(60) Provisional application No. 63/603,174, filed on Nov. 28, 2023.

(51) Int. Cl.
*A47J 36/32* (2006.01)
*B65G 1/06* (2006.01)

(52) U.S. Cl.
CPC ................ *A47J 36/32* (2013.01); *B65G 1/06* (2013.01); *B65G 2201/0202* (2013.01)

(58) Field of Classification Search
CPC .................................. A47J 36/32; B65G 1/06
See application file for complete search history.

(56) References Cited

U.S. PATENT DOCUMENTS

2004/0045975 A1* 3/2004 Leykin .................... G07F 9/105 221/150 R
2006/0261082 A1* 11/2006 Almblad ................ B65B 69/00 221/260
2018/0127192 A1* 5/2018 Cohen .................. A47J 36/321
2019/0125126 A1* 5/2019 Cohen .................... B65D 75/38
2019/0208957 A1* 7/2019 Almblad ................ A47J 36/32
2020/0384754 A1* 12/2020 Almblad ............ G07F 17/0078

* cited by examiner

*Primary Examiner* — Gene O Crawford
*Assistant Examiner* — Ayodeji H Ojofeitimi
(74) *Attorney, Agent, or Firm* — Nadya Reingand

(57) ABSTRACT

A dispensing device is provided, which can properly dispense tubular shaped food items (e.g., hot dogs) within a hot food vending machine. In the device, a spool drum provided over an open top container storing a stack of food items is driven to rotate in response to a user command. Guide bars are provided between the container and the drum such that a lifting film secured to the drum is positioned around the bars, entering the container to cradle the stack of food items. Two movable jaws attached to the top edge of the container can be in two positions. In the first position, the jaws pinch the opposing sections of the film, thereby sealing the stack of food items. In the second position, the jaws release the film such that the drum, when rotated, can wind the film until a top food item is lifted to a proper position.

7 Claims, 5 Drawing Sheets

DISPENSING DEVICE FOR HOT FOOD VENDING MACHINES

TECHNICAL FIELD

The present disclosure relates to the field of food vending machines. In particular, the present disclosure relates to a dispensing device for hot food vending machines.

BACKGROUND OF THE INVENTION

Hot food vending machines typically offer food items like hot dogs, hot sandwiches, pizza, fried snacks, and sometimes full meals. They work by keeping food refrigerated or frozen and reheating it using a microwave or infrared heating system before dispensing it to customers.

Dispensing assemblies for a hot food vending machine should be designed, inter alia, considering the shape of food items to be dispensed inside the hot food vending machine between different other assemblies (e.g., between an oven and a food item storage, etc.). However, the dispensing assemblies currently used in hot food vending machines encounter challenges associated with alignment and positioning. For example, in case of hot dog vending machines, hot dogs can roll or shift, leading to misalignment, thereby causing jams or even failure to dispense.

Given the above, more engineering is required to solve the above-mentioned issues of the dispensing assemblies. More specifically, a new dispensing mechanism is required, which can position food items (e.g., hot dogs) on rods/forks inside the hot food vending machine very precisely and consistently to guarantee their reliable dispensing.

SUMMARY OF THE INVENTION

This summary is provided to introduce a selection of concepts in a simplified form that are further described below in the detailed description. This summary is not intended to identify key features of the present disclosure, nor is it intended to be used to limit the scope of the present disclosure.

It is an objective of the present disclosure to provide an improved dispensing assembly design for hot food vending machines that are used for vending tubular shaped food items (e.g., hot dogs).

The objective above is achieved by the features of the independent claim in the appended claims. Further embodiments and examples are apparent from the dependent claims, the detailed description, and the accompanying drawings.

According to an aspect, a dispensing device for a hot food vending machine is provided, which comprises the following constructive elements: an open top container, a spool drum, a drive assembly, guide bars, a lifting film, two movable jaws, and a food item carrier. The open top container is configured to store a stack of food items each having a tubular shape of equal diameter and length. The spool drum is provided over the open top container, and the drive assembly is coupled to the spool drum and configured to cause the spool drum to rotate in response to a user command. The guide bars are provided between the open top container and the spool drum. The lifting film has two ends secured to the spool drum and is positioned around the guide bars, entering the open top container so as to cradle the stack of food items. The two movable jaws are attached to a top edge of the open top container such that the two movable jaws face each other and engage with the lifting film. The food item carrier comprises at least two horizontally movable rods. The two movable jaws are configured to be in a first position and a second position, the second position being initiated in response to the user command. In the first position, the two movable jaws are configured to pinch opposing sections of the lifting film together such that the stack of food items is sealed. In the second position, the two movable jaws are configured to release the lifting film such that the spool drum, when caused by the drive assembly to rotate, is configured to wind the lifting film until the stack of food items is lifted by the lifting film to a predefined vertical position for a top food item of the stack of food items. The predefined vertical position corresponds to a position in which the lifted top food item is gripped and transported by the at least two horizontally movable rods to an oven of the hot food vending machine. The dispensing device thus configured provides efficient (with no jam) dispensing of tubular shaped food items to the proper vertical position where they can be picked or grabbed and transported by the food item carrier.

In one exemplary embodiment, the lifting film has a pre-marked section to be arranged in the open top container. If the lifting film has such marks, it may be aligned with the open top container more efficiently.

In one exemplary embodiment, the lifting film has a perforation at each of the two ends. In this embodiment, the spool drum comprises at least one alignment peg and a movable locking bar. The at least one alignment peg is sized to receive the two ends of the lifting film through the perforations. The movable locking bar is configured to secure the lifting film to the spool drum when the two ends of the lifting film are received by the at least one alignment peg. This drum design may provide a more secure attachment of the lifting film.

In one exemplary embodiment, the open top container is covered with an airtight coating. The airtight coating may reduce air permeability, which may help keep the food item fresh for a longer period of time.

In one exemplary embodiment, the dispensing device further comprises a distance sensor provided between the spool drum and the open top container. The distance sensor is configured to determine that the top food item exits the open top container and send a signal to the drive assembly and the two movable jaws. The drive assembly is further configured, in response to the signal, to stop rotation of the spool drum when the top food item is in the predefined vertical position. The two movable jaws are configured, in response to the signal and after the top food item is picked and transported by the at least two horizontally movable rods, to return to the first position. The distance sensor may facilitate more accurate movement of the food items within the dispensing device.

In one exemplary embodiment, each of the two movable jaws has an L-shaped cross-section. This shape may provide adequate clearance for the food times to move out of the top of the container and mechanical strength to efficiently pinch the opposing sections of the lifting film.

In one exemplary embodiment, the open top container is configured to store the stack of food items each with the diameter ranging from 0.625 inches to 1.125 inches and the length of 6 inches or less. This means that the dispensing device may be used for dispensing differently-sized tubular shaped food items, which may make it more flexible in use.

Other features and advantages of the present disclosure will be apparent upon reading the following detailed description and reviewing the accompanying drawings.

BRIEF DESCRIPTION OF DRAWINGS

The present disclosure is explained below with reference to the accompanying drawings in which.

DETAILED DESCRIPTION OF THE INVENTION

Figure 1:
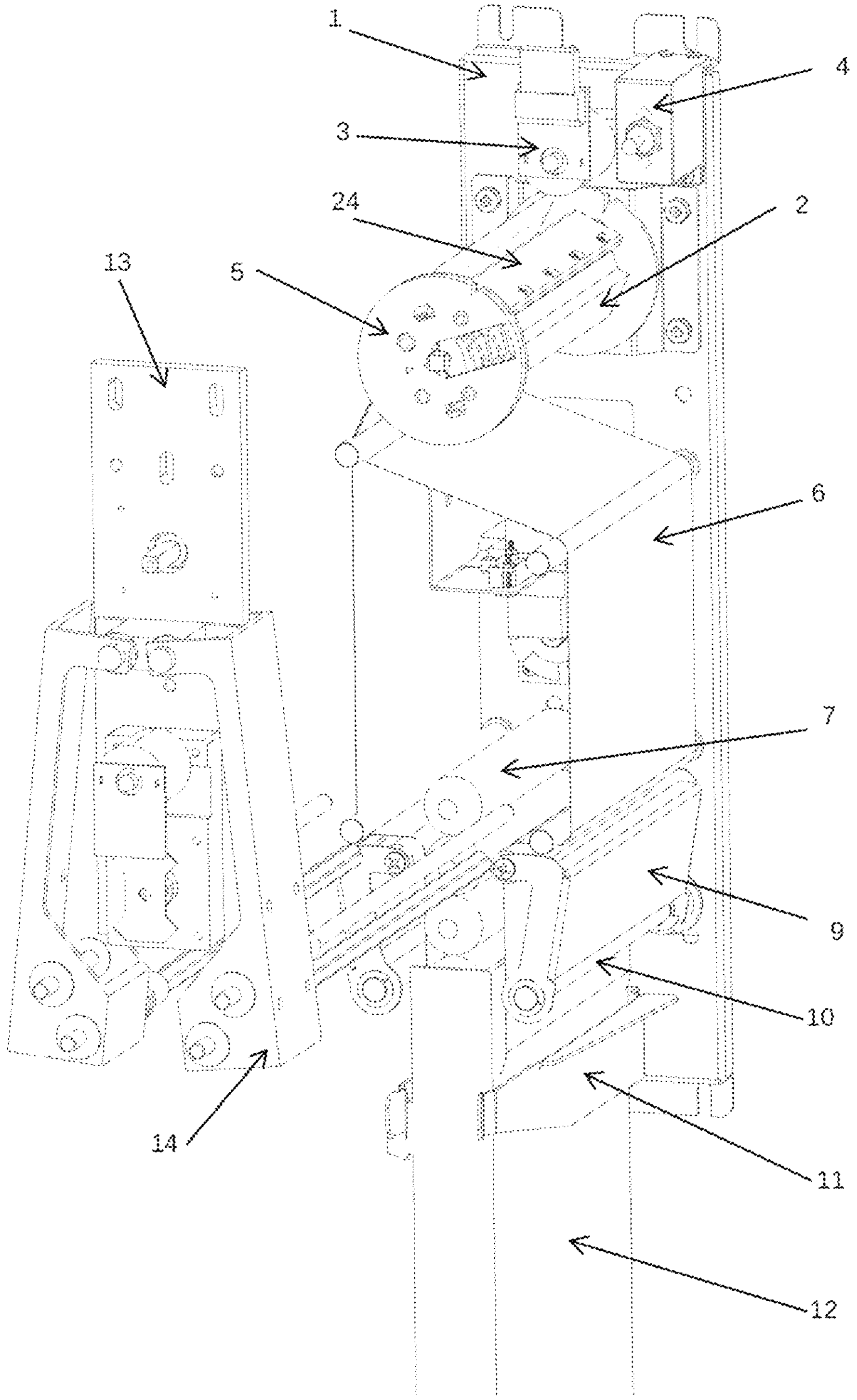
FIG. 1 shows a schematic general isometric view of a dispensing device according to one exemplary embodiment.
Figure 2:
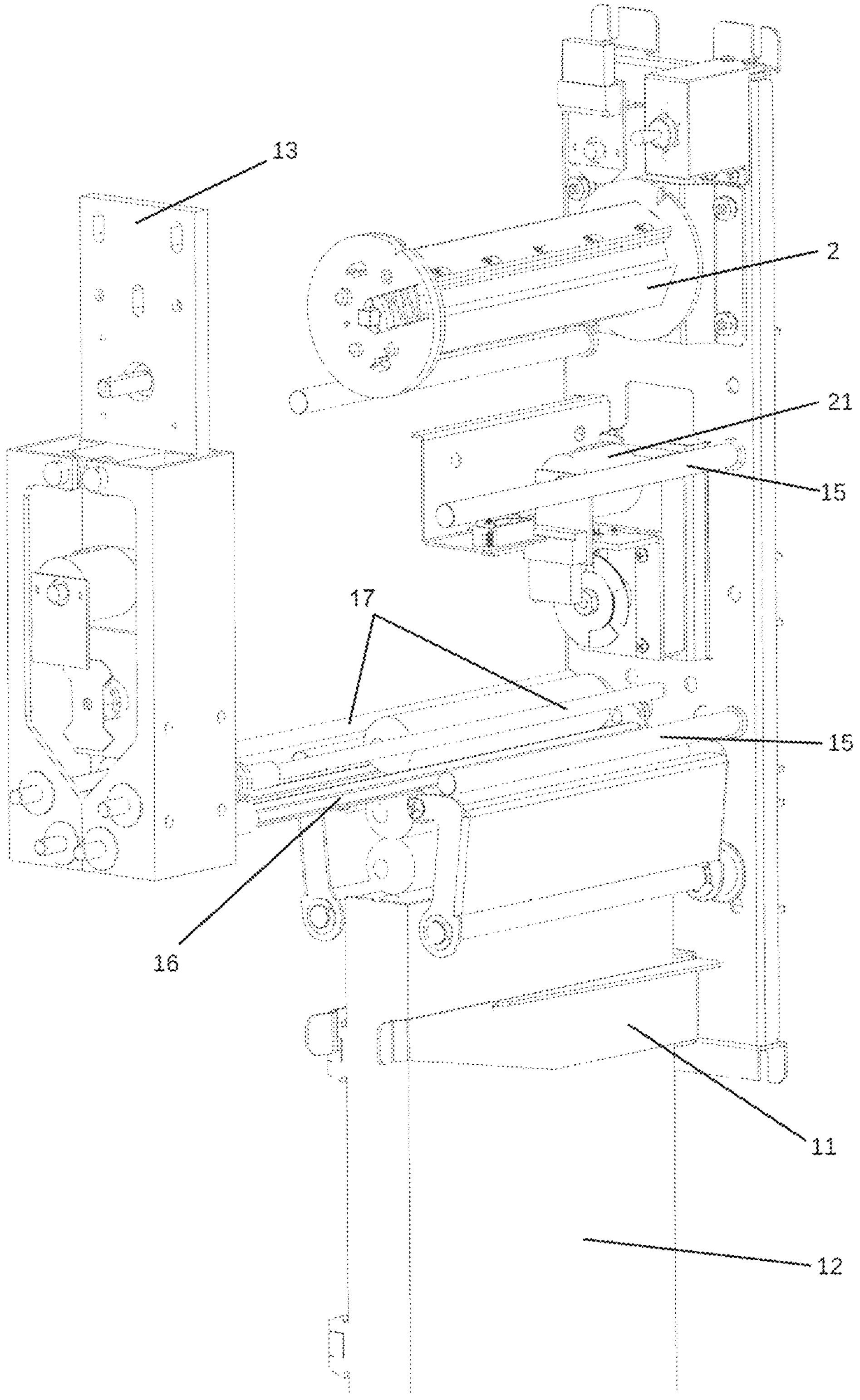
FIG. 2 shows a schematic isometric view of the dispensing device with a lifting film missing.
Figure 3:
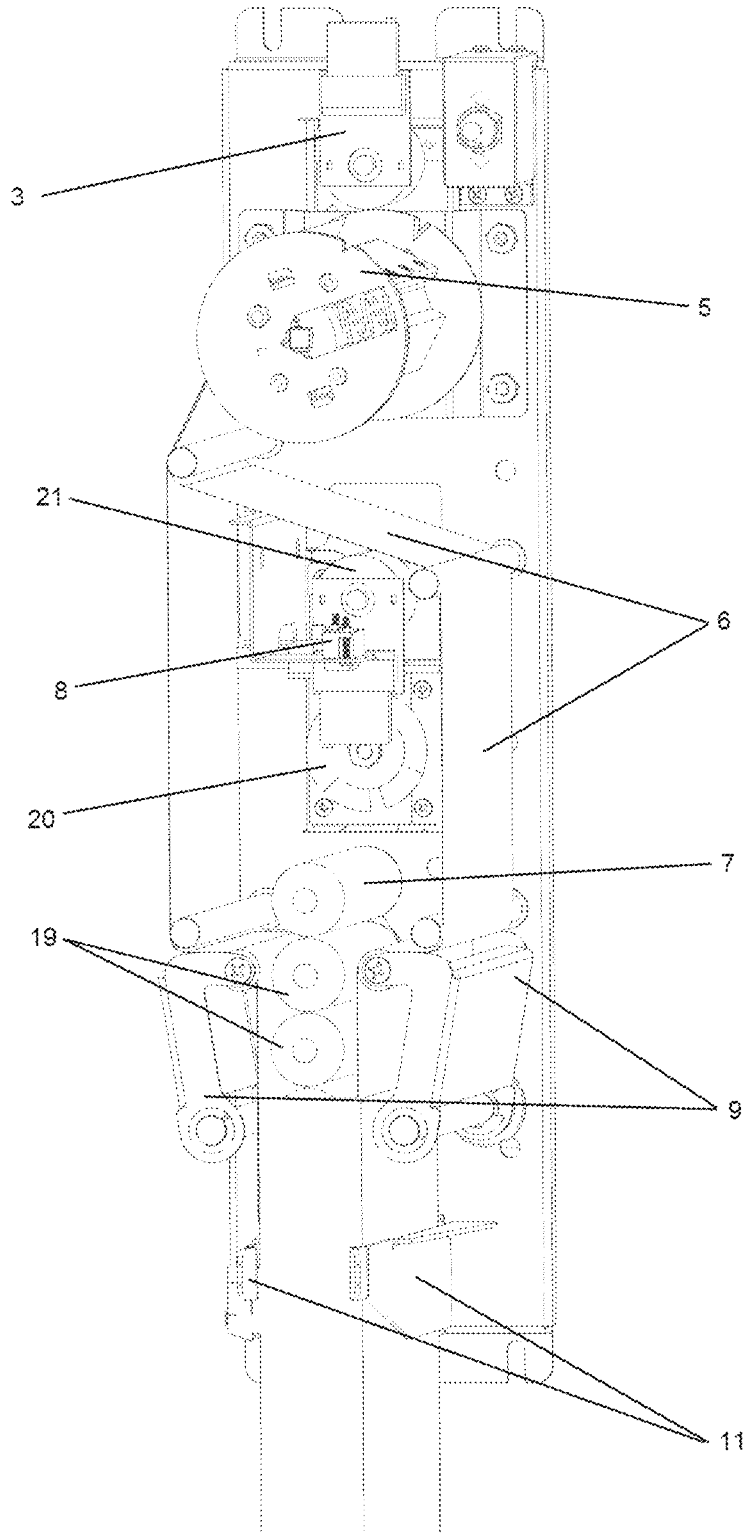
FIG. 3 shows a schematic isometric view of the dispensing device, in which only device elements responsible for delivering food items to a predefined vertical position are shown.

Various embodiments of the present disclosure are further described in more detail with reference to the accompanying drawings. However, the present disclosure can be embodied in many other forms and should not be construed as limited to any certain structure or function discussed in the following description. In contrast, these embodiments are provided to make the description of the present disclosure detailed and complete.

According to the detailed description, it will be apparent to the ones skilled in the art that the scope of the present disclosure encompasses any embodiment thereof, which is disclosed herein, irrespective of whether this embodiment is implemented independently or in concert with any other embodiment of the present disclosure. For example, the apparatus disclosed herein can be implemented in practice by using any numbers of the embodiments provided herein. Furthermore, it should be understood that any embodiment of the present disclosure can be implemented using one or more of the elements presented in the appended claims.

With references to FIGS. 1-5, a dispensing device 1 will be now described with respect to a hot dog vending machine. At the same time, the dispensing device 1 may be used for dispensing not only hot dogs, buy any other tubular shaped food items (with the above-mentioned diameters and lengths) that may be offered by different hot food vending machines.

The dispensing device 1 is configured to store and dispense hot dogs 7 from an open top container 12 to a hot dog carrier 14 and a transfer mechanism 13 to an oven (not shown). The entire dispensing device 1 is assumed to be refrigerated and sealed from ambient air.

A stack 19 of hot dogs 7 is loaded side-by-side and cradled by a lifting film or belt 6 that is partly housed in the container 12. The lifting film 6 may be pre-labeled or pre-marked to show its proper position within the container 12 and to show how many hot dogs 7 must be placed to fill the entire container 12, and to provide an excess portion of the film 6 extending from the container 12 so that the lifting film 6 can be utilized by a lifting assembly (described below). The container 12 may be optionally coated giving it a very low air permeability, which helps maintain hot dog freshness. The container 12 has two functions: It stores the hot dogs 7 inside the vending machine, and it serves as the protective packaging of the hot dogs 7 for transport between the hot dog packaging and vending machine locations. At the vending machine, the container 12 is placed in a refrigerator compartment (not shown) in a container-specific location below the lifting system. For example, a clamp 11 may be used to secures the container 12 inside the refrigerator compartment.

It should be noted that there may be more than one container 12 or, in other words, more than one device 1 in the vending machine. For example, the vending machine may comprise four containers 12 each configured to store the hot dogs 7 (and/or other tubular shaped food items) having a particular bun diameter and length (selected from the above-given diameter and length ranges).

Once the fully loaded container 12 is placed in position below the lifting system, the excess portion of the lifting film 6 is weaved between guide bars 15 and then around a spool drum 2. There may be perforations at both ends of the lifting film 6 to ensure that the opposing sections of the lifting film 6 are placed together at a proper position on installation studs (or alignment pegs) 29 of the spool drum 2. Once the ends of the lifting film 6 are in the proper position, a locking bar 24 matching the shape of the spool drum 2 and having corresponding elongated holes 25 is pivoted down into one of the installation studs 29 and secured in place. The locking bar 24 secures the lifting film 6 to the spool drum 2, which enables both ends of the lifting film 2 to travel vertically equally using only one drive gearmotor. A drive assembly 3 lifts the stack 19 of hot dogs 7 vertically on demand into a predefined vertical position required to be taken away by a transfer mechanism 13.

Figure 5:
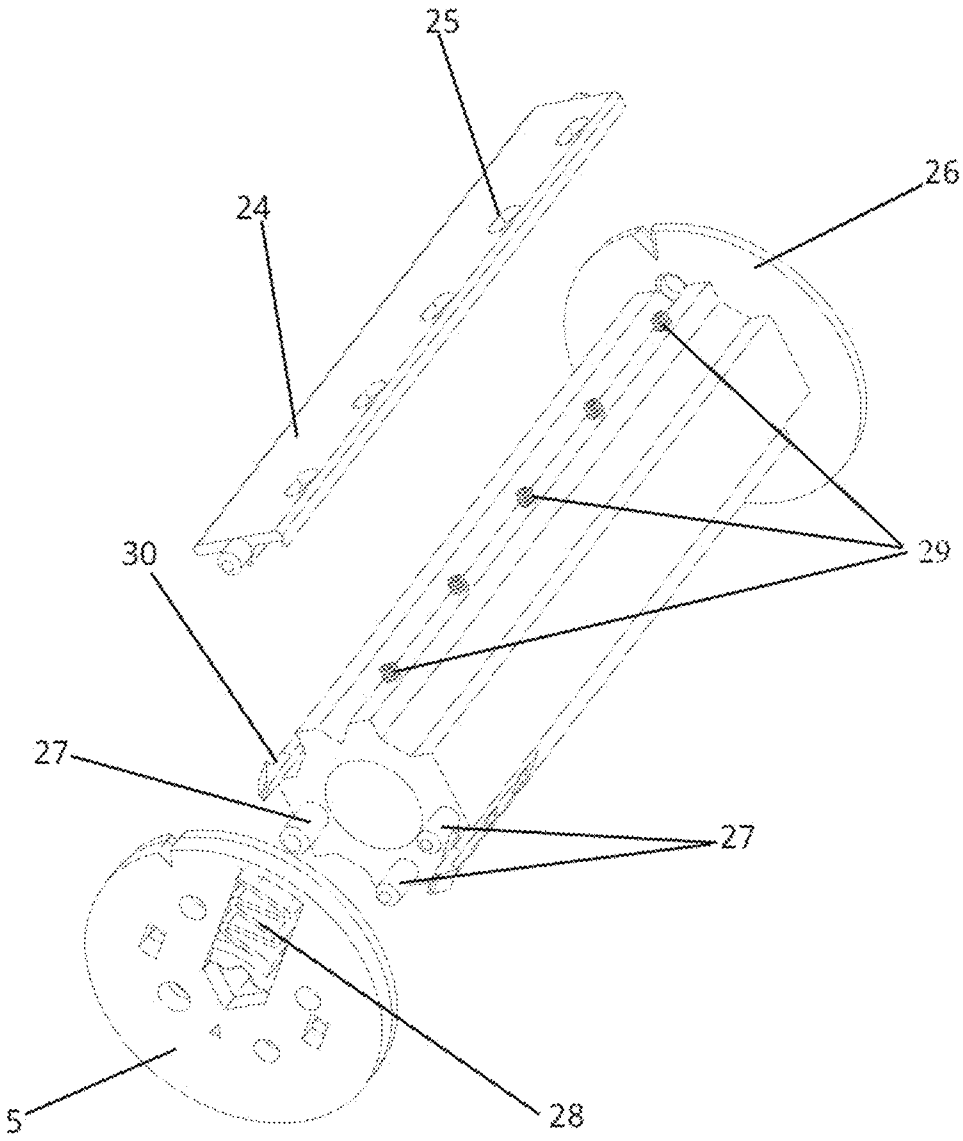
FIG. 5 shows a schematic exploded view of a spool drum used in the dispensing device.

As also shown in FIG. 5, the spool drum 2 may comprise a non-removable flange 26 that acts as a stop for the lifting film 6 on the inside drum surface, as well as end posts 27 that align a removable flange 5 to the spool drum end. The removable flange 5 has a spring-loaded flange square cavity 28 that allows a square spool drum square drive shaft to turn a drum assembly; an integrated spring mechanism makes it easy to remove and install the removable flange 5. Drum end hooks 30 are used to hold and release the removable flange 5 to/from the spool drum 2.

The device 1 further includes a pair of opposing movable jaws 9 at the top of the container 12. A closure mechanism 9 may be used to move the jaws 9 to an open or closed position. The closure mechanism 9 may be driven by a gearmotor 21. The jaws 9 will be in a closed position when there is no demand for the hot dogs 7 (i.e., no customer desiring to purchase the hot dog 7 from the vending machine); the closed position is when the jaws 9 are against each other pinching the opposing sections of the lifting film 6 together. With the jaws 9 in the closed position, the hot dogs 7 are relatively sealed by the lifting film 6 and the (coated) container 12.

Figure 4:
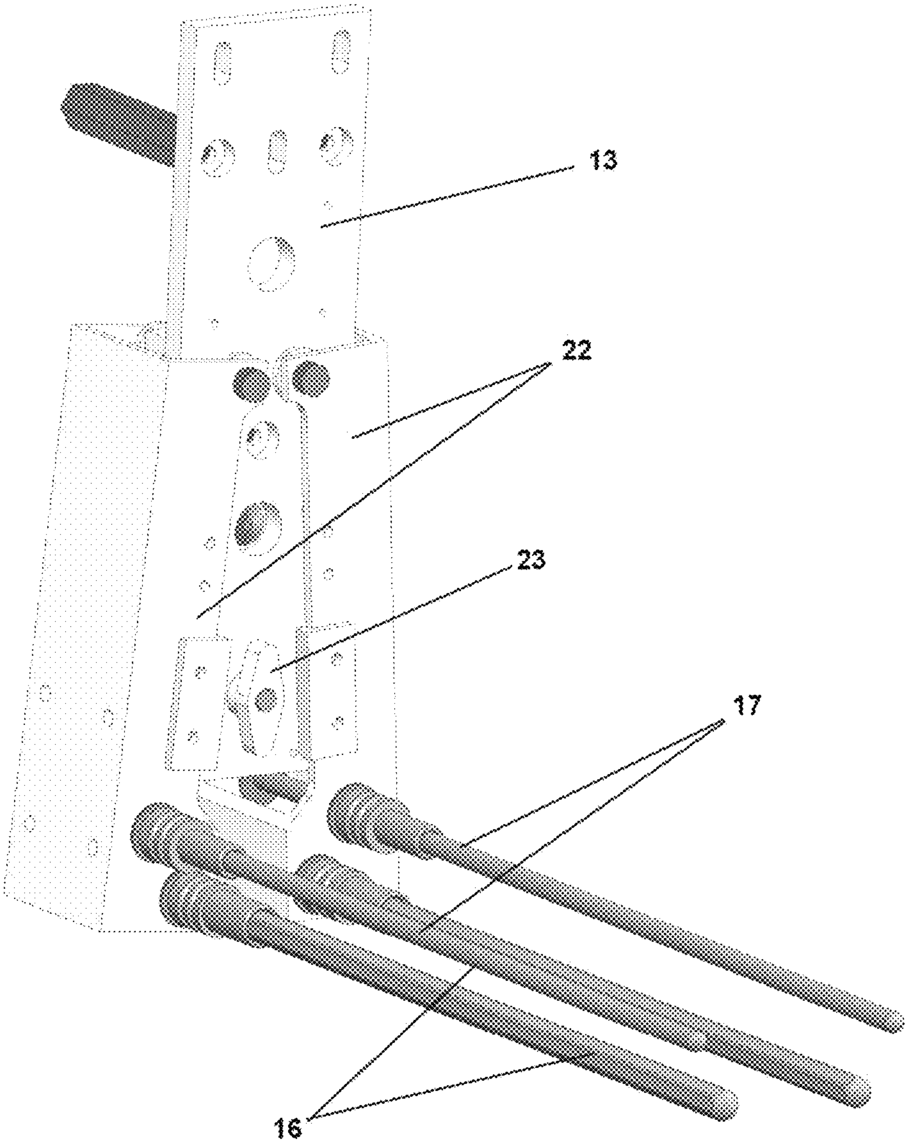
FIG. 4 shows a schematic isometric view of a food item carrier used in the dispensing device.

As noted earlier, there may be more than one (e.g., four) dispensing device 1 installed in the vending machine, thereby allowing users to select different hot dogs. Once the hot dog 7 is selected (i.e., a user command is received), the corresponding dispensing device 1 that houses the selected hot dog 7 begins the dispensing process as follows. The jaws 9 open, thereby providing a lifting channel for the selected hot dog 7. The spool drum 2 then rotates until a distance sensor 8 determines that the hot dog 7 is in the correct vertical position to be removed by the hot dog carrier 14. The distance to which the jaws 9 open and the height of the top of the hot dog 7 are adjusted by the diameter of the selected hot dog 7. The vending machine operator must input the hot dog diameter into the vending machine when he or she fills the container 12 with the hot dogs 7. The distance sensor 8 will stop lifting the stack 19 of hot dogs 7 when the top hot dog 7 is in the proper vertical position. When the hot dog 7 is in the proper vertical position, the hot dog carrier 14 positions its two or more horizontally movable rods 16 such that they pick the hot dog 7 and the transfer mechanism 13 transports the hot dog 7 to the oven. Optionally, the hod dog carrier 14 may comprise two or more barrier rods 17 that may be used to more securely hold the hot dog 7 on the rods 16. As also shown in FIG. 4, the transfer mechanism 13 may comprise mechanical arms 22 that the rods 16 and 17 are mounted on, and a cam 23 used to control the opening and closing of the mechanical arms 13.

The control of the various movements of the hot dogs 7 and control of the access doors and closure jaws 9 may be controlled by proximity switches and one or more distance sensors 8 along with a control board that provides the sequence of all operations.

Although the exemplary embodiments of the present disclosure are described herein, it should be noted that any various changes and modifications could be made in the embodiments of the present disclosure, without departing from the scope of legal protection which is defined by the appended claims. In the appended claims, the word "comprising" does not exclude other elements or operations, and the indefinite article "a" or "an" does not exclude a plurality. The mere fact that certain measures are recited in mutually different dependent claims does not indicate that a combination of these measures cannot be used to advantage.

The invention claimed is:

1. A dispensing device for a hot food vending machine, the dispensing device comprising:

an open top container configured to store a stack of food items each having a tubular shape of equal diameter and length;

a spool drum provided over the open top container;

a drive assembly coupled to the spool drum and configured to cause the spool drum to rotate in response to a user command;

guide bars provided between the open top container and the spool drum;

a lifting film having two ends secured to the spool drum, the lifting film being positioned around the guide bars and entering the open top container so as to cradle the stack of food items;

two movable jaws attached to a top edge of the open top container such that the two movable jaws face each other and engage with the lifting film; and a food item carrier comprising at least two horizontally movable rods;

wherein the two movable jaws are configured to be in a first position and a second position, the second position being initiated in response to the user command;

wherein, in the first position, the two movable jaws are configured to pinch opposing sections of the lifting film together such that the stack of food items is sealed;

wherein, in the second position, the two movable jaws are configured to release the lifting film such that the spool drum, when caused by the drive assembly to rotate, is configured to wind the lifting film until the stack of food items is lifted by the lifting film to a predefined vertical position for a top food item of the stack of food items;

wherein the predefined vertical position corresponds to a position in which the top food item is picked and transported by the at least two horizontally movable rods to an oven of the hot food vending machine.

2. The dispensing device of claim 1, wherein the lifting film has a pre-marked section to be arranged in the open top container.

3. The dispensing device of claim 1, wherein the lifting film has a perforation at each of the two ends, and wherein the spool drum comprises:

at least one alignment peg sized to receive the two ends of the lifting film through the perforations; and a movable locking bar configured to secure the lifting film to the spool drum when the two ends of the lifting film are received by the at least one alignment peg.

4. The dispensing device of claim 1, wherein the open top container is covered with an airtight coating.

5. The dispensing device of claim 1, further comprising a distance sensor provided between the spool drum and the open top container, the distance sensor being configured to:

determine that the top food item exits the open top container; and send a signal to the drive assembly and the two movable jaws;

wherein the drive assembly is further configured, in response to the signal, to stop rotation of the spool drum when the top food item is in the predefined vertical position; and wherein the two movable jaws are configured, in response to the signal and after the top food item is picked and transported by the at least two horizontally movable rods, to return to the first position.

6. The dispensing device of claim 1, wherein each of the two movable jaws has an L-shaped cross-section.

7. The dispensing device of claim 1, wherein the open top container is configured to store the stack of food items each with the diameter ranging from 0.625 inches to 1.125 inches and the length of 6 inches or less.

* * * * *